(12) United States Patent
Nasta et al.

(10) Patent No.: US 9,531,416 B2
(45) Date of Patent: Dec. 27, 2016

(54) RADIOFREQUENCY SIGNAL RECEIVER DESIGNED TO BE INSTALLED ON A SATELLITE

(71) Applicant: THALES, Courbevoie (FR)

(72) Inventors: Rodolphe Nasta, Toulouse (FR); Thierry Populus, Fontenilles (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/650,552

(22) PCT Filed: Dec. 6, 2013

(86) PCT No.: PCT/EP2013/075790
§ 371 (c)(1),
(2) Date: Jun. 8, 2015

(87) PCT Pub. No.: WO2014/090699
PCT Pub. Date: Jun. 19, 2014

(65) Prior Publication Data
US 2015/0318884 A1    Nov. 5, 2015

(30) Foreign Application Priority Data
Dec. 14, 2012  (FR) ...................... 12 03404

(51) Int. Cl.
*H04B 14/06* (2006.01)
*H04B 1/10* (2006.01)
*H04B 7/185* (2006.01)

(52) U.S. Cl.
CPC ........ *H04B 1/1036* (2013.01); *H04B 7/18515* (2013.01); *H04B 2001/1072* (2013.01)

(58) Field of Classification Search
CPC ........... H04L 25/03038; H04L 27/2647; H04L 2025/03414; H04L 25/03057; H04B 1/1036
USPC ....................................... 375/350
See application file for complete search history.

(56) References Cited

U.S. PATENT DOCUMENTS

| 4,479,255 A | 10/1984 | Geesen et al. |
| 5,507,025 A * | 4/1996 | Rodeffer ........... 455/266 |
| 8,463,223 B2 * | 6/2013 | Dickey et al. ...... 455/296 |

FOREIGN PATENT DOCUMENTS

| WO | 2009/080754 A1 | 7/2009 |
| WO | 2010/106019 A1 | 9/2010 |

* cited by examiner

Primary Examiner — Helene Tayong
(74) Attorney, Agent, or Firm — Baker & Hostetler LLP

(57) ABSTRACT

A receiver for radiofrequency signals designed to be installed on board a satellite comprises: a device for frequency controlling the receiver allowing the reception frequency of the receiver to be adjusted based on a frequency command; and a filtering assembly of the bandpass filter type having a passband, referred to as passband of the filtering assembly, having an adjustable passband width able to take a set of values, the filtering assembly allowing the bandwidth of a first signal representative of the input signal of the receiver to be limited to the passband of the filtering assembly; adjustment means allowing the width of the passband of the filtering assembly to be adjusted using a filtering passband control; power acquisition means allowing a measurement of the power of the first signal to be delivered at the output of the filtering assembly.

5 Claims, 3 Drawing Sheets

RADIOFREQUENCY SIGNAL RECEIVER DESIGNED TO BE INSTALLED ON A SATELLITE

CROSS-REFERENCE TO RELATED APPLICATIONS

This application is a National Stage of International patent application PCT/EP2013/075790, filed on Dec. 6, 2013, which claims priority to foreign French patent application No. FR 1203404, filed on Dec. 14, 2012, the disclosures of which are incorporated by reference in their entirety.

FIELD OF THE INVENTION

The invention relates to a radiofrequency signal receiver designed to be installed on board a satellite. The invention notably relates to a satellite remote control receiver also referred to as a TCR or TTC receiver, from the acronyms for "Telemetry, Command and Ranging" and "Telemetry Tracking and Command".

This type of TTC or TCR receiver is installed on board a geostationary or non-stationary satellite and implements a TTC or TCR remote control link between ground stations and the satellite.

The invention also relates to receivers for telecommunications signals of the repeater type and to satellite miss-distance receivers designed to be installed on board satellites.

BACKGROUND

A current need is to be able to know the spectrum of the signals received by a receiver within a range of operating frequencies over which it can operate when it is installed on board a satellite.

The knowledge of the spectrum can allow noise interference to be detected and solutions for resisting noise interference to be implemented or the reception frequencies of several satellites to be optimized during an orbital position change.

One solution for tracing this spectrum consists in installing a spectrum analyzer on board the satellite. The spectrum analyzer has the drawback of being a unit of equipment which as such occupies a non-negligible volume on the satellite. However, one challenge is to limit as far as possible the number of units of equipment installed on board satellites. Furthermore, this unit of equipment is complex and costly.

Another solution consists in analyzing, in a ground station, the power of the signals sent back to this station by a repeater installed on board the satellite. The satellite repeater receives uplink signals, amplifies them and transmits downlink signals based on the amplified signals. This solution has the following drawback: the uplink signals which are amplified and re-transmitted are, for example, useful telecommunication signals emitted within predetermined frequency bands spaced out from one another. The signals are re-emitted within the same bands or within other frequency bands also spaced out from one another. The analysis on the ground does not allow the spectrum between these bands of frequency to be known. In other words, it is not possible to know the power spectrum of the signals received by the receiver over the entirety of the range of operating frequencies of the receiver.

SUMMARY OF THE INVENTION

The aim of the invention is to overcome the aforementioned drawbacks.

This objective is achieved by equipping a radiofrequency signal receiver, designed to be installed on board a satellite:

with a device for frequency controlling the receiver allowing the reception frequency of the receiver to be adjusted based on a frequency control, with a filtering assembly of the bandpass filter type having a passband, referred to as passband of the filtering assembly, whose width is adjustable and can take a set of values, the filtering assembly allowing the bandwidth of a first signal representative of the input signal of the receiver to be limited to the passband of the filtering assembly, with adjustment means allowing the width of the passband of the filtering assembly to be adjusted based on a filtering passband control, with power acquisition means allowing a measurement of the power of the first signal to be delivered at the output of the filtering assembly.

This solution offers a receiver which is capable of supplying power spectra with different resolutions of an input signal of the receiver over analysis bands corresponding to the operating frequency range or to sub-bands of the operating frequency range while performing scannings of these analysis bands with different step sizes and adjusting the width of the passband of the filtering assembly to a width equal to at least the selected step size. It therefore allows, by a suitable command of the control device and of the adjustment means, the power of the signal received by the satellite to be known in a continuous manner over any analysis band.

This solution also has the advantage of not requiring the installation of a dedicated spectrum analyzer on board the satellite. Furthermore, this receiver allows the same functions as a spectrum analyzer to be carried out, namely the tracing of a spectrum exhibiting a higher or lower resolution since it is possible to scan operating frequencies of the receiver with several step sizes and to choose a passband width adapted to the step size so as to obtain a continuous spectrum.

Advantageously, the receiver comprises a frequency conversion chain assembly delivering at its output the first signal centered on a fixed intermediate frequency, the frequency conversion chain assembly comprising a first frequency conversion chain receiving the input signal from the receiver and delivering at its output a first intermediate signal centered on a first fixed intermediate frequency, the first frequency conversion chain comprising:

a synthesized local oscillator design to deliver an output signal from the oscillator at a frequency referred to as oscillator frequency taken from amongst a set of predetermined oscillator frequencies using a frequency control, a mixer receiving the signal received at the input of the receiver and the output signal from the oscillator and delivering a first intermediate signal centered on a first intermediate frequency.

Advantageously, the filtering assembly comprises at least one bandpass filter, said bandpass filter being centered on the intermediate frequency.

Advantageously, the filtering assembly comprises at least one bandpass filter, said bandpass filter being a low-pass filter when the intermediate frequency is equal to 0 Hz.

Advantageously, the receiver is a remote control receiver.

Another subject of the invention is a set of receivers comprising a nominal radiofrequency signal receiver and a redundant radiofrequency signal receiver, the redundant receiver being a receiver according to the invention.

Another subject of the invention is a satellite equipped with a receiver according to the invention.

Another subject of the invention is a system for acquisition of a power spectrum of an input signal of a receiver comprising a receiver according to the invention and control means able to generate and to send to the receiver a set of power acquisition commands comprising successive frequency commands sent to the control device, the frequency commands being defined such that the control device adjusts the reception frequency of the receiver to successive acquisition frequencies bounding and marking out an acquisition frequency band and being spaced from one another by the acquisition step size, the set of acquisition commands furthermore comprising a filtering passband control sent to the adjustment means in order to adjust the width of the passband of the filtering assembly to a predetermined acquisition width while the control device adjusts the reception frequency of the receiver to the successive acquisition frequencies.

In this way, the acquisition means deliver a power measurement each time that the receiver adjusts its reception frequency to an acquisition frequency, the power measurements being carried out over elementary frequency bands having a width equal to the acquisition width.

Advantageously, the control means are configured so as to generate spectrum acquisition commands in which the acquisition width is equal to at least the acquisition step size.

Advantageously, the control means are configured so as to generate spectrum acquisition commands in which the acquisition width is equal to the acquisition step size.

Advantageously, the control means comprise processing means installed on board the satellite and are able to generate the set of spectrum acquisition commands starting from a first set of commands previously received by the onboard processing means and defining the acquisition frequency band and the acquisition width and/or the acquisition step size.

Advantageously, the receiver is a redundant receiver.

Advantageously, the receiver comprises a demodulation circuit allowing the signal to be demodulated, the demodulation circuit comprising another bandpass filter allowing the noise frequency band of the first signal to be limited, the filtering assembly being distinct from said other bandpass filter.

Advantageously, the system comprises means allowing of envoyer said power measurements to be sent simultaneously to a ground station from the satellite.

Another subject of the invention is a method for acquisition of a power spectrum of signals received at the input of a receiver, the method being implemented by means of an acquisition system according to the invention comprising a receiver according to the invention, in which a power spectrum of signals received by said receiver is acquired by means of an acquisition system according to the invention, over a predefined acquisition frequency band, comprising:
- a step for generating and for sending the successive frequency commands to the control device, by the control means, in such a manner that the control device adjusts the reception frequency of the receiver to successive acquisition frequencies space out one from the next by the acquisition step size,
- a step for generating and for sending to the adjustment means, by the control means, a filtering passband control equal to a predetermined acquisition width,
- a step for adjustment of the width of the passband of the filtering assembly to the acquisition width, by means of the adjustment means,
- a scanning step, during which the control device adjusts the reception frequency of the receiver to the successive acquisition frequencies,
- and, each time that the receiver adjusts its reception frequency to an acquisition frequency, a step for filtering the first signal by means of the filtering assembly, and a step for acquiring, by means of the power acquisition means, the power of the first signal at the output of the filtering assembly.

Advantageously, the acquisition width is equal to at least the acquisition step size.

Advantageously, the control means comprise processing means installed on board the satellite capable of generating the set of spectrum acquisition commands starting from a first set of commands defining the acquisition frequency band and the elementary band width and/or the acquisition step size, the method comprising a preliminary step for generating and for sending the first set of commands to the processing means from a ground station.

Advantageously, the method comprises a step for transmission of the power measurements to a transmitter installed on board the satellite and a step for simultaneously sending said measurements to a ground station.

Another subject of the invention is a method for optimizing the reception frequency of the receiver comprising:
- at least one step for acquiring a spectrum according to the acquisition method according to the invention,
- a step for identifying a frequency band verifying a predetermined spectral quality criterion based on the power measurements,
- a step for generating a frequency command designed to adjust the reception frequency of the receiver to a frequency included within the identified frequency band and a step for sending the frequency command to the control device.

BRIEF DESCRIPTION OF THE DRAWINGS

Other features and advantages of the invention will become apparent upon reading the detailed description that follows, presented by way of non-limiting example and with reference to the appended drawings in which.

From one figure to another, the same elements are identified by the same references.

DETAILED DESCRIPTION

The subject of the invention is a radiofrequency signal receiver that is flexible in frequency designed to be installed on board a satellite.

A 'receiver flexible in frequency' is understood to mean a receiver having an adjustable operating frequency able to take a plurality of values within a range of operating frequencies or any desired value within this range. This type of receiver comprises control means, or a control device, allowing the reception frequency of the receiver to be adjusted. This may be a telecommunications receiver of the repeater type, a miss-distance receiver for a satellite whose function is to orient a satellite antenna so that it points toward a given point on the ground.

In one preferred embodiment, the receiver is a remote control receiver such as previously defined. The remote control receiver already incorporates a bandpass filter within its ASIC having a width equal to the width of the modulation that it receives (in other words to the width of the bandwidth of the useful signal) with the aim of measuring the level of power received: filters are readily added into the ASIC for the purposes of measuring a spectrum.

Figure 1:
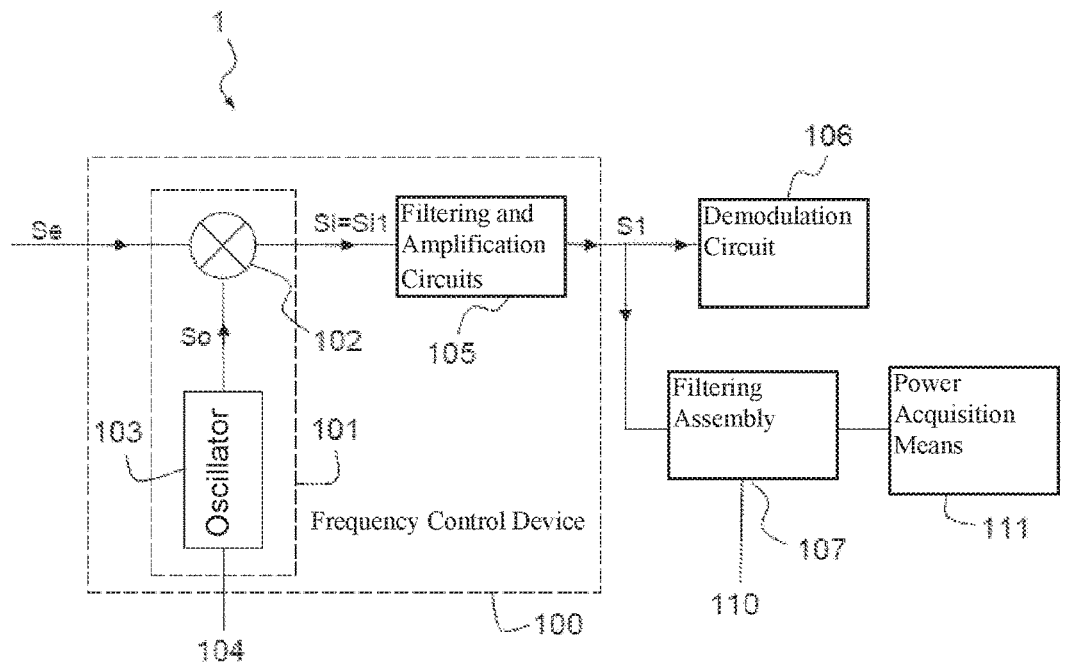
FIG. 1 shows a block diagram of one example of a receiver according to the invention.

FIG. 1 shows a block diagram of a remote control receiver 1 according to the invention.

It comprises a frequency control device 100 allowing, based on a frequency command, the adjustment of the reception frequency of the receiver over the operating frequency range. The reception frequency FR is the frequency on which the reception frequency window of the receiver is centered. The range of operation of a radiofrequency receiver designed to be installed on board a satellite is a wide band of the order of a GHz. For example, in the Ku band, the range of operating frequencies of the receiver extends between 13750 MHz and 14500 MHz.

This range of operating frequencies may be for example scanned with a step size in the range between 100 Hz and 100 kHz during the acquisition of a spectrum. This scanning may be carried out over all or a part of the frequency range.

When the receiver scans an acquisition frequency band with an acquisition step size, it adjusts its reception frequency FR to consecutive frequencies of the analyzing frequency band spaced out one from the next by the acquisition step size.

As can be seen in FIG. 1, the frequency control device 100 for the receiver 1 receives a signal Se obtained at the input of the receiver and delivers a first signal S1. The first signal corresponds to the input signal obtained at the input of a receiver, when the latter is operating at the reception frequency, this input signal being filtered, and amplified, and shifted into an intermediate frequency. It should be noted that the intermediate frequency may, for example, be equal to zero; this shift is then referred to as conversion into baseband.

The control device comprises a frequency conversion assembly delivering, at its output, a signal, referred to as intermediate signal Si, at a predetermined (fixed) intermediate frequency FI.

The frequency conversion assembly comprises a first frequency conversion chain 101 delivering, at its output, a signal centered on a first predetermined intermediate frequency FI1 which is fixed for the receiver.

The first frequency conversion chain 101 comprises:
a synthesized local oscillator 103, for example a fractional oscillator, designed to deliver an output signal So from the oscillator at a frequency referred to as oscillator frequency FO taken from amongst a predetermined set of oscillator frequencies, based on a frequency command 104,
a mixer 102 receiving the input signal Se from the receiver and the output signal So from the oscillator 103 and delivering a first intermediate signal Si1 centered on a first intermediate frequency FI1.

In the embodiment in FIG. 1, the frequency conversion assembly comprises a single frequency conversion chain which is the first frequency conversion chain 101. The first intermediate frequency FI1 is therefore equal to the intermediate frequency FI and the first intermediate signal Si1 is the intermediate signal Si.

Given that the intermediate frequency FI is fixed, modifying the frequency of the oscillator modifies the reception frequency of the receiver. In the case where the conversion assembly comprises a single conversion chain, the frequency scanning step size of the oscillator is furthermore equal to the frequency scanning step size of the reception frequency. The reception frequency is given by the following formula FR=FO±FI. In other words, scanning all of the oscillator frequencies allows the reception frequencies to be scanned with the same step size.

As a variant, the frequency conversion assembly comprises a plurality of frequency conversion chains. It then comprises at least a second conversion chain, the second conversion chain receives, at its input, the output of the first conversion chain.

The control device also comprises an assembly of filtering and amplification circuits 105 allowing the signal at the output of the conversion assembly chain 101 to be amplified and filtered and delivering, at its output, the first signal s1.

The receiver furthermore comprises:
a demodulation circuit 106 whose function is to demodulate the signal at the output of the frequency conversion chain assembly in order to recover the data included in the input signal of the receiver,
a filtering assembly 107 allowing the frequency band of the first signal S1 to be limited to a predefined bandwidth.

The demodulation circuit 106 is generally speaking a circuit whose function is to demodulate a first signal S1 representative of the input signal of the receiver.

The filtering assembly 107 is of the bandpass filter type. It has an adjustable passband, referred to as passband of the filtering assembly. The filtering assembly 107 allows the bandwidth of the first signal S1 (representative of the input signal of the receiver Se) to be limited to the passband of the filtering assembly.

Figure 2:
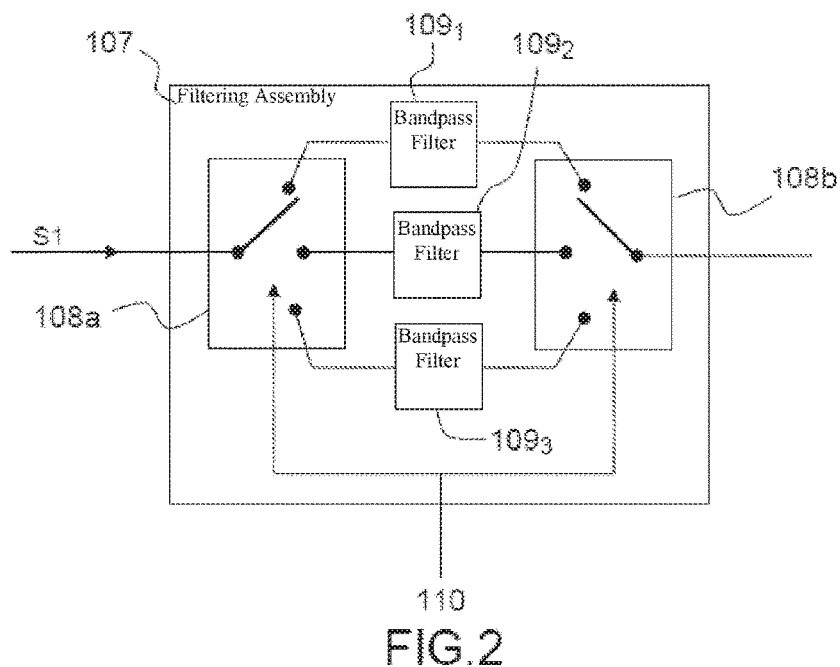
FIG. 2 shows a block diagram of a filtering assembly according to the invention.

The device furthermore comprises adjustment means, in other words a device for adjusting the width of the passband 108a, 108b, which can be seen in FIG. 2, allowing the width of the passband of the filtering assembly to be adjusted using a filtering passband control 110. The adjustment device can be, in the case of a digital filter, a register whose coefficients are modified in order to modify the passband. In the case of an analog filter, the adjustment device is, for example, a switching circuit.

In other words, the width of the passband of the filtering assembly can take a set of values.

The filtering assembly 107 may comprise a single filter whose bandwidth is adjustable by setting coefficients (case of digital filters). The width of the passband may be adjustable in a continuous fashion or may be able to take a plurality of predetermined discrete values. The controlling means, in other words adjustment means, for such filters, for example a register, act on the setting of coefficients.

It may also comprise a plurality of bandpass filters having passbands of different widths. The adjustment means then comprise selection means, in other words a selection device, for the filter toward which the first signal S1 is oriented as in the example described hereinbelow.

As can be seen in FIG. 2, the filtering assembly 107 comprises a plurality of bandpass filters $109_i$ with i=1 to N where N is equal to at least 2 and N=3 in the example in FIG. 2. It also comprises adjustment means for the width of the passband of the filtering assembly comprising first orientation means 108a, in other words a first orientation device, allowing the first signal S1 to be oriented toward a bandpass filter referred to as selected bandpass filter, taken from amongst all of the bandpass filters based on a band-width command 110. The adjustment means also comprise second orientation means 108b, in other words a second orientation device, allowing only the signal at the output of the selected filter to be transmitted toward the means for measuring the power 111. The filtering assembly and the adjustment means allow the bandwidth of the first signal S1 to be limited to the passband of the selected bandpass filter depending on the required resolution. Here, the means 108a and 108b are of the multi-position switch type. The orientation devices are, for example, switching circuits.

The receiver also comprises power acquisition means 111, in other words a power acquisition device, allowing a measurement of the power of the first signal S1 to be delivered at the output of the bandpass filtering assembly 107. The power acquisition device is for example an analog power detection circuit or a processor in the digital case. In other words, each time that the receiver adjusts its reception frequency to a frequency of operation, the power acquisition means 111 carry out the acquisition of the power received by the receiver over a frequency band of width equal to the width of the passband of the filtering assembly such as adjusted by the adjustment means.

The filtering assembly 107 is configured in such a manner that the power measurement is representative of the power of the input signal, within the bandwidth of the selected bandpass filter, centered on the reception frequency of the receiver. For the embodiments in FIGS. 1 and 3, this implies that the bandpass filters are centered on the intermediate frequency FI if the intermediate frequency is not zero. In other words, the passbands are centered on the intermediate frequency. In the case where the intermediate frequency is zero, the filtering is carried out by bandpass filters.

The receiver according to the invention offers the possibility, by carrying out a joint intelligent control of the control means and adjustment means 108a, 108b for the bandwidth, of measuring the power spectrum of the signal received by the receiver, over the entirety of its operating frequency range in a continuous fashion and with several degrees of precision or resolutions of analysis. The continuity of the spectrum is obtained by adjusting the passband of the filtering assembly 107 over a band width at least equal to the acquisition step size.

As a result, the receiver allows a true spectrum analyzer function to be provided. By installing this type of receiver on board a satellite, it is no longer necessary to install onboard equipment dedicated to the analysis of this spectrum.

By scanning the range of operating frequencies of the receiver with a predetermined acquisition step size and by choosing a bandwidth of width equal to the scanning step size, a spectrum is formed that has as high a resolution as possible for this step size. By scanning the band of operation of the receiver with the scanning step size and by choosing a bandpass filter of width greater than the scanning step size, a spectrum with a slightly lower resolution, in other words smoothed or redundant, is obtained. It should be noted that remote control receivers conventionally have a control device for the frequency of the receiver, a bandpass filter and, potentially, means of acquisition of the power over a band having the width of the bandwidth of this filter. The bandwidth of the bandpass filter is of the order of 1 MHz (for a conventional frequency modulation receiver) which corresponds to the bandwidth of the useful radio control signal which is sent to the receiver under the normal conditions of use. However, this bandpass filter does not allow a high-resolution spectral analysis to be carried out within the operating frequency band of the receiver.

These frequency acquisition means allow the power of the useful remote control signal received by the remote control receiver in the useful frequency band of the receiver to be measured in order to verifier that the level of the useful signal received is higher than a predetermined threshold.

The bandpass filter has a first function which is to limit the noise band of the received signal in order to optimize the demodulation of the useful signal. Its band width is the bandwidth of the useful signal. This bandpass filter not shown is disposed in the demodulation chain 106. According to the invention, the receiver comprises either at least one additional bandpass filter, whose band width may be fixed or adjustable, or a single bandpass filter but whose bandwidth is necessarily adjustable. In the first case, the receiver according to the invention therefore comprises at least one bandpass filter which is no longer dedicated to the measurement of the power of the useful signal but above all which is no longer dedicated to the limitation of the noise frequency band of the received signal in order to optimize the demodulation of the signal. The additional bandpass filter whose bandwidth is adjustable is dedicated to the tracing of a power spectrum. In this first case, the bandpass filter allowing the noise frequency band to be limited in order to optimize the demodulation of the first signal is incorporated into the demodulation circuit 106. In this case, the bandpass filter whose bandwidth is adjustable, in other words the filtering assembly 107, is distinct from the bandpass filter included within the demodulation circuit 106. In other words, the filtering assembly 107 is situated outside of the demodulation circuit 106. The bandwidth of the bandpass filter which is integrated into the demodulation circuit 106 is fixed. The receiver according to the invention allows both the measurement of a power spectrum to be carried out and its function for demodulating the received signal to be carried out.

Advantageously, the filtering assembly 107 is configured so as to be able to have at least one passband with a width less than the bandwidth of the useful signal sent to the receiver under the normal conditions of use and preferably in the range between 100 Hz and 100 kHz.

Advantageously, the filtering assembly 107 has a passband with an adjustable width able to take a set of values comprising a value at least 10 times lower than the width of the bandwidth of the useful signal. This feature allows a spectrum to be obtained that has a good resolution by choosing this passband width and by scanning the frequencies with a step size equal to this passband.

Another subject of the invention is an assembly of receivers comprising a nominal radiofrequency signal receiver and a redundant radiofrequency signal receiver. The redundant receiver is intended to replace the nominal receiver when the latter is defective. Advantageously, the redundant receiver is the radiofrequency receiver. This feature allows, by a suitable joint control using the control and adjustment means, the power spectrum of the signals received by the receiver to be acquired, during or outside of the operation of the receiver.

As a variant, the nominal receiver is a receiver according to the invention. It is possible to acquire the power spectrum of the signals received by the useful receiver only outside of the operation of the receiver, in other words when the latter is not receiving remote control signals (in the case of a remote control receiver).

Figure 3:
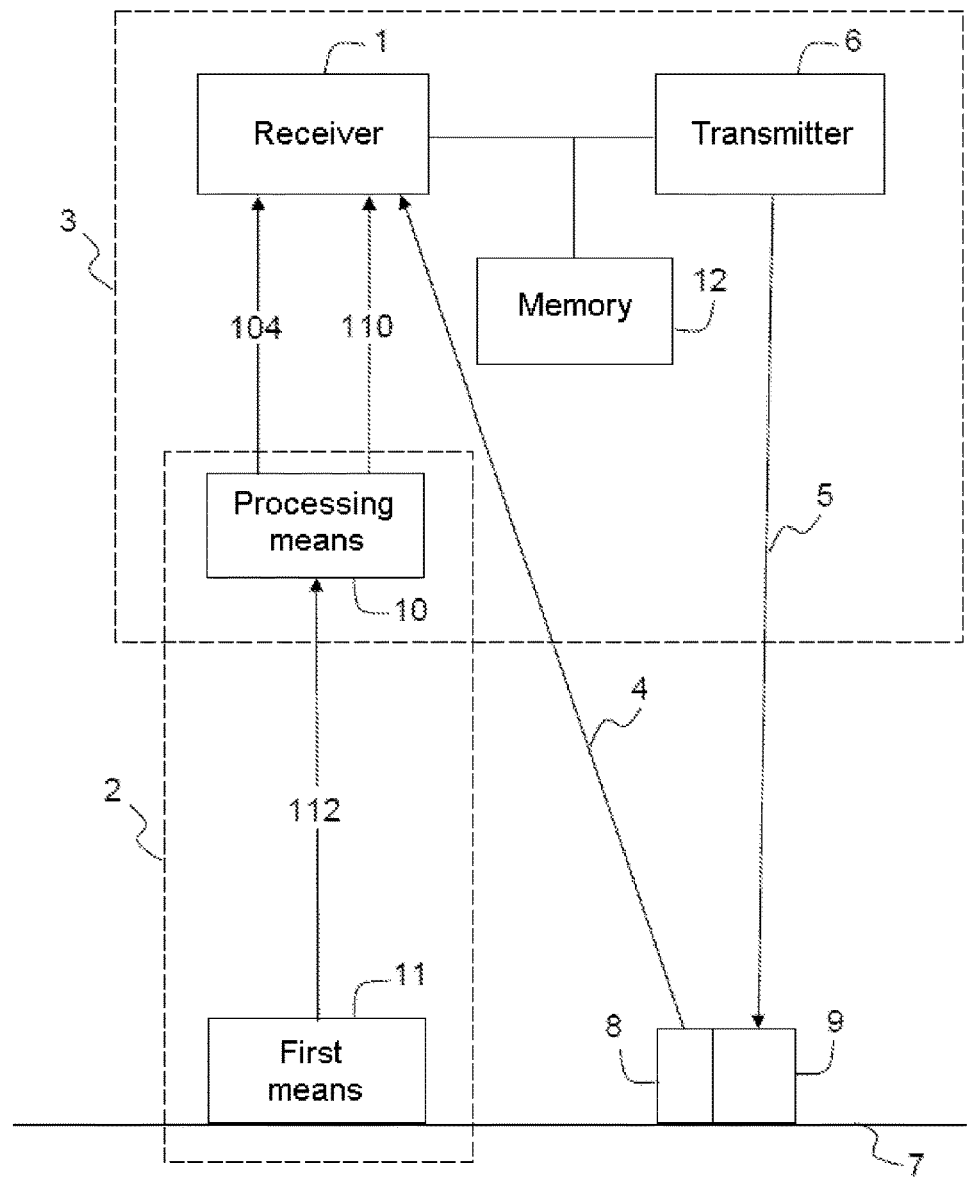
FIG. 3 shows schematically a system for acquiring a spectrum according to the invention.

FIG. 3 shows a system for acquiring a power spectrum of the signals received by a receiver according to the invention.

This system comprises:

a receiver 1 according to the invention installed on board a satellite 3, control means 2, in other words a control device, capable of generating and of sending to the receiver 1 a set of commands for acquiring a spectrum in order for the receiver to acquire power measurements over an acquisition frequency band, corresponding to all or part of the operating frequency band, by scanning said acquisition frequency band with an acquisition step size, and by measuring, for each reception frequency of the receiver, the power of the first signal over an elementary acquisition frequency band having a width equal to an acquisition width taken from amongst the passband widths that the filtering assembly can have. The set of acquisition commands comprises successive frequency commands 104 successively sent to the control device, the control frequencies being defined such that the control device 100 adjusts the reception frequency of the receiver 1 to successive frequencies bounding and marking out the acquisition frequency band and being spaced out one from the next by the acquisition step size. The set of acquisition commands furthermore comprises a filtering passband width command 110 corresponding to the acquisition width.

The system comprises a communications uplink 4 between the ground station 7 and the satellite 3 allowing the ground station 7 to send data to the satellite 3. This could, for example, be the communications uplink between the receiver 1 and a transmitter 8 situated in a ground station 7 or between another receiver and a transmitter 8 situated in a ground station 7.

It also comprises a communications downlink 5 allowing a transmitter 6 installed on board the satellite 3 to send data to the ground station. The transmitter is, for example, a remote measurement TTC or TCR transmitter situated on board the satellite 3. The transmitter is designed to send data to a receiver 9 situated in a ground station 7.

Advantageously, the control means 2 are configured so as to generate spectrum acquisition commands 104, 110 such that the acquisition width is at least equal to the acquisition step size.

Advantageously, the control means 2 are configured so as to generate spectrum acquisition commands in which the acquisition width is equal to the acquisition step size, the receiver comprising a filter passband equal to the acquisition step size. This allows a non-redundant power spectrum to be obtained that is continuous over the acquisition frequency band.

The control means 2 comprise processing means 10 installed on board the satellite. These could, for example, be of a processor module integrated into the receiver, a processing function or an onboard computer installed on the satellite as shown in FIG. 3. In other words, the control means comprise at least one processor 10.

The processing means 10 are capable of generating the set of spectrum acquisition commands starting from a first set of commands 112 previously received by the processing means 10 and defining the acquisition frequency band (for example the minimum frequency and the maximum frequency) and a spectral resolution.

The resolution of the spectrum corresponds to the precision with which the spectrum is to be generated, and this could, for example, be the elementary band width. The processor then generates an acquisition step size which is, at the most, equal to this band width. It could also be the acquisition step size. The processor then generates a command for a width of frequency band taken from amongst the band widths of the whole assembly of bandpass filters at least equal to the step size. The first set of commands may also comprise a command for the time at which the processor is to start the acquisition of the spectrum.

Advantageously, the control means 2 comprise first means 11 installed in a control ground station 7 for generating the first set of commands 112, the first means being a first device, for example a processor, and this first set of commands 112 being sent to the processing means 10 via the uplink 4. The reception of these commands generates the acquisition of the spectrum within the acquisition band defined on the ground, instantaneously or at the time indicated. As a variant, the first means are installed on the ground outside of the control station 7. They are connected to the control station 7 via a ground link. These means could, for example, be a processor installed in a SCC (satellite control center) where the remote control signals destined for the receiver are generated and where the remote measurements coming from the receiver are received. This SCC can be connected to the control station 7 via a terrestrial network. The control station 7 receives the control signals 112 via the network, modulates them and transmits them via the link 4.

The generation of the frequency and filtering passband width commands on board the satellite enables the acquisition of a spectrum to be quickly carried out. Indeed, the successive frequency commands are not sent directly from the ground station to the receiver or to an onboard computer which would be very time consuming and constraining since this assumes that the uplink will not be loaded when these commands are sent.

As a variant, the control means 2 are integrated into the ground station. The set of acquisition commands is sent by the ground station to the receiver via the uplink.

As a variant, the control means are integrated on board the satellite.

Advantageously, the receiver 1 comprises transmission means, in other words a transmission device, allowing the power measurements acquired during the acquisition of the spectrum to be simultaneously sent to a ground station from the satellite. These means advantageously comprise means for storing data 12, in other words a memory, allowing of stocker the measurements to be stored prior to sending it to the ground via the transmitter. This allows the occupation of the bandwidth to be limited to the minimum and the speed of the process to be increased.

Another subject of the invention is a method for acquiring a spectrum from the signals received by the receiver by means of an acquisition system according to the invention over an acquisition frequency band corresponding to all or part of the operating frequency range of the receiver.

Figure 4:
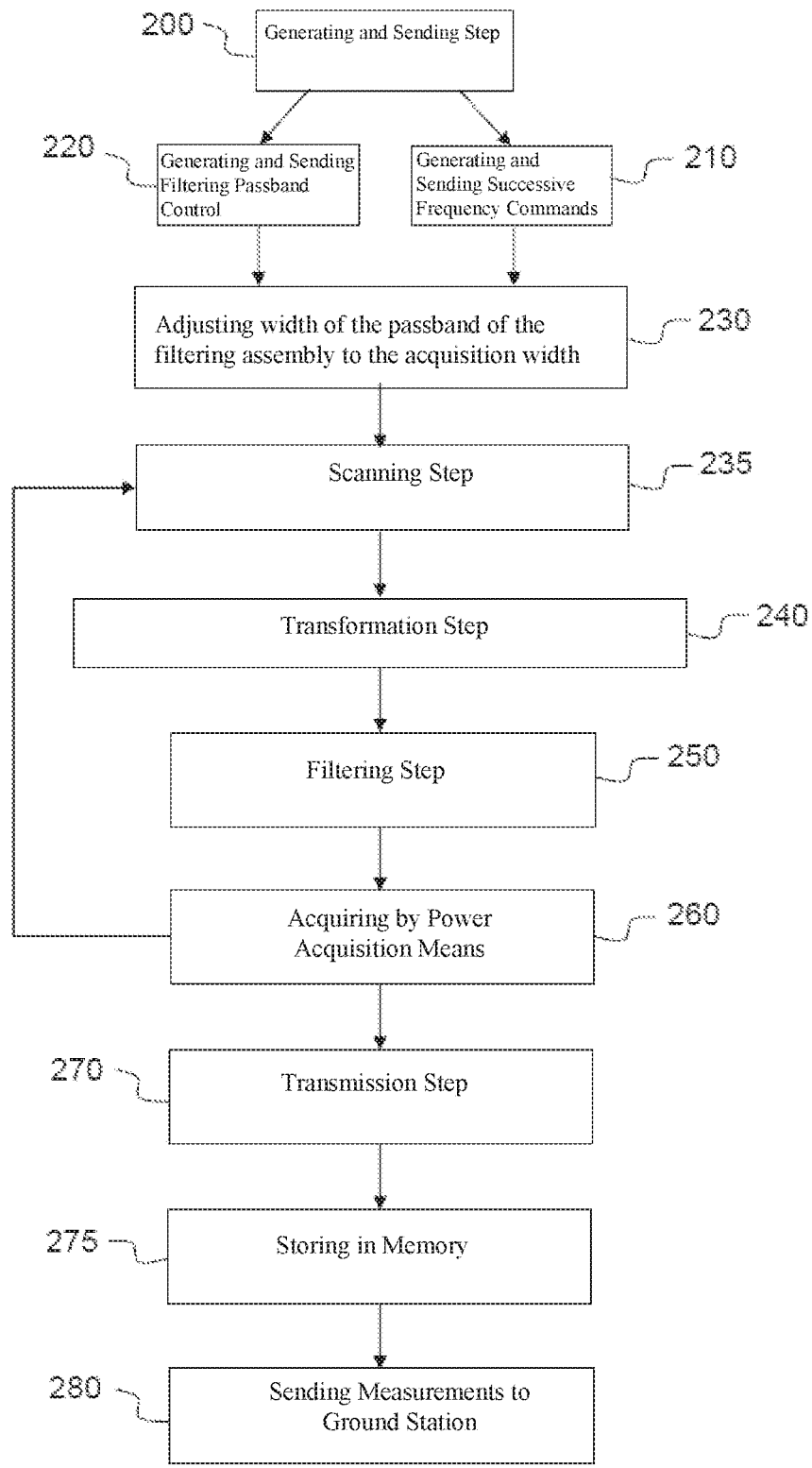
FIG. 4 shows the steps of a method for acquiring a spectrum according to the invention.

The method comprises, as can be seen in FIG. 4, a step 210 for generating and for sending successive frequency commands to the control device, by the control means 2, in such a manner that it adjusts the reception frequency of the receiver to successive acquisition frequencies of the acquisition frequency band spaced out one from the next by the acquisition step size, a step 220 for generating and for sending to the adjustment means, by the control means 2, a filtering passband control equal to a predetermined acquisition width, a step 230 for adjusting the width of the passband of the filtering assembly to the acquisition width, a scanning step, during which the control device adjusts 235 the reception frequency of the receiver to the successive acquisition frequencies, and, each time that the receiver adjusts 235 its reception frequency, to an acquisition frequency, a step 250 for filtering the first signal by means of the filtering assembly 107, and a step 260 for acquiring, by means of the power acquisition means 111, the power of the first signal at the output of the filtering assembly.

The method also comprises a step 240 for the transformation of the signal received at the input of the receiver into a first signal S1 when the receiver is such as that shown in FIG. 1.

During the scanning step, the receiver adjusts for example first of all its frequency to the minimum frequency and increments its frequency with the acquisition step size up to the maximum frequency.

The acquisition width is advantageously equal to at least the acquisition step size. It is advantageously equal to the acquisition step size.

Advantageously, the method comprises a preliminary step for generating and for sending 200 the first set of commands to the processing means from a ground station. As a variant, the spectrum acquisition commands are generated in a ground station and sent to the receiver from the ground station.

At the end of the method, power measurements are obtained that are representative of the power of the signals received by the satellite within the acquisition frequency band over elementary analysis bands having a width equal to the acquisition width and being centered around the operating frequencies scanned by the receiver during this acquisition.

The measurement of the power of the ambient noise in the environment of the receiver over the acquisition frequency band is therefore obtained when the acquisition of the spectrum is carried out outside of the periods of acquisition of a useful signal by the useful receiver and the power measurement of the ambient noise, together with the power measurement of the received signal when the measurement of the spectrum is carried out, during the acquisition of a useful signal (here a remote control signal), by a redundant receiver.

The method advantageously comprises a step 270 for transmission of the power measurements to a transmitter installed on board the satellite, for example a TTC transmitter, directly or via the processor installed on board the satellite, and a step 280 for sending said measurements to a ground station via the downlink 5. The measurements are advantageously sent simultaneously to the ground station. These measurements are then stored in memory 275 on board the satellite in the storage means 12, and are sent at the same time to the onboard station. This allows the occupation of the downlink to be limited.

The spectrum is obtained by normalizing these measurements in spectral densities, in other words by transforming them into spectral power densities over elementary bands centered on the operating frequencies scanned by the receiver during this acquisition and having a width equal to the acquisition width. This operation is an operation well known to those skilled in the art.

Advantageously, another subject of the invention is a method for optimizing the frequency of the receiver based on the power measurements. The use of the power measurements allows the optimum frequencies to be identified, for example, those without noise interference, to which the reception frequency of the receiver should be adjusted.

The method comprises:
at least one step for acquiring a spectrum using the acquisition method according to the invention,
a step for identifying a frequency band verifying a predetermined spectral quality criterion based on the power measurements,
a step for generating a frequency command designed to adjust the reception frequency of the receiver to a frequency included within the frequency band identified and a step for sending the frequency command to the control device.

The method advantageously comprises a step for tracing the spectrum (or spectra) over the acquisition frequency band based on said measurements, The spectral quality criterion can be a criterion for absence of occupation or noise interference of a frequency band. Advantageously, this band verifies a second bandwidth criterion which must be equal to at least the width of the bandwidth of the useful signal to be sent to the receiver under the normal conditions of use. The frequency command is defined such that the control device adjusts the frequency of the receiver to the center of the identified frequency band.

Advantageously, these steps are carried out in the ground station.

A frequency band without noise is for example a frequency band in which the power spectral density is less than a predetermined threshold or a frequency band in which the spectrum is in accordance with a reference spectrum that the receiver is supposed to receive under the normal operating conditions.

Advantageously, the method comprises a plurality of successive steps for acquisition of the spectrum over the band. The identification of the unoccupied frequency band or that without noise interference is carried out using the various spectra. The tracing of several spectra allows for example the maximum of the spectral density over a given period of time or else the average of the spectral density over a given period of time to be calculated.

The invention claimed is:

1. A method for acquiring a power spectrum of an input signal, the method being implemented by means of an acquisition system for acquiring the power spectrum, the acquisition system including:
    a radiofrequency signal receiver designed to be installed on board a satellite, the radiofrequency signal receiver including:
        a device for frequency controlling the radiofrequency signal receiver allowing a reception frequency of the radiofrequency signal receiver to be adjusted based on a frequency command, and
        a filtering assembly of a bandpass filter type exhibiting a passband, referred to as the passband of the filtering assembly, having an adjustable passband width to take a set of values, the filtering assembly allowing a bandwidth of a first signal representative of the input signal of the radiofrequency signal receiver to be limited to the passband of the filtering assembly,
        adjustment means allowing the width of the passband of the filtering assembly to be adjusted using a filtering passband control, and
        power acquisition means allowing a measurement of a power of the first signal to be delivered at an output of the filtering assembly, and
    control means for generating and sending to the radiofrequency signal receiver a set of power acquisition commands having successive frequency commands sent to a control device, the frequency commands being defined in such a manner that the control device adjusts the reception frequency of the radiofrequency signal receiver to successive acquisition frequencies bounding and marking out an acquisition frequency band and being spaced out from a next acquisition frequency by an acquisition step size, the set of power acquisition commands furthermore including a filtering passband control sent to the adjustment means in order to adjust the width of the passband of the filtering assembly to a predefined acquisition width while the control device adjusts the reception frequency of the radiofrequency signal receiver to the successive acquisition frequencies, the method comprising:

a first step for acquiring a power spectrum of signals received by said radiofrequency signal receiver is acquired over a predefined acquisition frequency band, a step for generating and sending successive frequency commands to the control device, by the control means, in such a manner that the control device adjusts the reception frequency of the radiofrequency signal receiver to the successive acquisition frequencies spaced out one from the next by the acquisition step size, a step for generating and sending to the adjustment means, by the control means, the filtering passband control equal to the predefined acquisition width, a step for adjusting the width of the passband of the filtering assembly to the acquisition width by means of the adjustment means, a scanning step, during which the control device adjusts the reception frequency of the radiofrequency signal receiver to the successive acquisition frequencies, each time that the radiofrequency signal receiver adjusts the reception frequency to an acquisition frequency, a step for filtering the first signal by means of the filtering assembly, and a second step for acquiring, by means of the power acquisition means, the power of the first signal at the output of the filtering assembly.

2. The method as claimed in claim 1, in which the acquisition width is equal to at least the acquisition step size.

3. The method as claimed in claim 1, in which the control means comprise processing means installed on board the satellite for generating the set of spectrum acquisition commands starting from a first set of commands defining the acquisition frequency band and the elementary band width or the acquisition step size, the method comprising a preliminary step for generating and for sending the first set of commands to the processing means from a ground station.

4. The method as claimed in claim 1, comprising a step for transmission of the power measurements to a transmitter installed on board the satellite and a step for simultaneously sending said measurements to a ground station.

5. A process for optimizing the reception frequency of the radiofrequency signal receiver comprising:
   at least one step for acquiring the power spectrum according to the method of claim 1,
   a step for identifying a frequency band verifying a predetermined spectral quality criterion based on the power measurements, and
   a step for generating a frequency command designed to adjust the reception frequency of the receiver to a frequency included within the identified frequency band and a step for sending the frequency command to the control device.

* * * * *